No. 639,133. Patented Dec. 12, 1899.
J. R. BALL.
SHAFT COUPLING OR CLAMP.
(Application filed July 24, 1899.)
(No Model.)
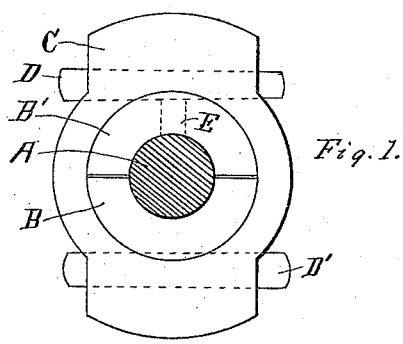
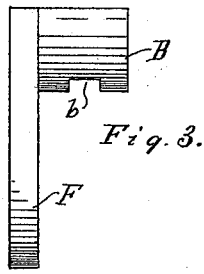
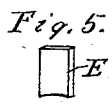
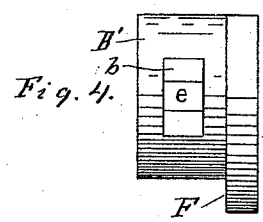
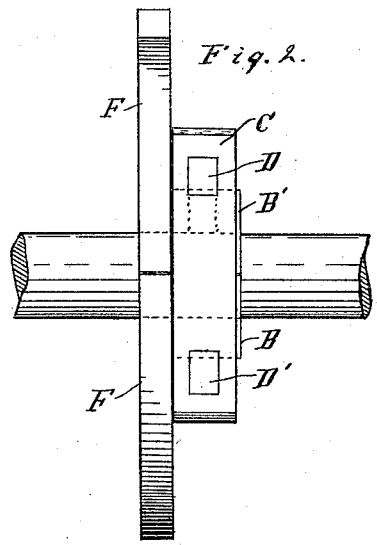
Witnesses.
Estella Cilley.
F. B. Parks.
Inventor.
John R. Ball
By Ithiel J. Cilley
Attorney.

UNITED STATES PATENT OFFICE.

JOHN R. BALL, OF DURANGO, COLORADO.

SHAFT COUPLING OR CLAMP.

SPECIFICATION forming part of Letters Patent No. 639,133, dated December 12, 1899.

Application filed July 24, 1899. Serial No. 725,002. (No model.)

*To all whom it may concern:*

Be it known that I, JOHN R. BALL, a citizen of the United States, residing at Durango, in the county of La Plata and State of Colorado, have invented certain new and useful Improvements in Shaft Couplings or Clamps, of which the following is a specification.

My invention relates to improvements in the manner of securing pulleys, &c., to shafting, and more particularly to the fastening of the cams upon the shafts in stamping-mills; and its object is to provide means whereby said cams may be readily removed and replaced without uncoupling or disturbing the shaft, and I attain this object by the mechanism illustrated in the accompanying drawings, in which—

Figure 1 is a side elevation of my clamp upon a section of shafting. Fig. 2 is a front view of the same with a cam in position. Fig. 3 is a side elevation of a cam and its hub. Fig. 4 is top view of the opposite cam, and Fig. 5 is a perspective of the auxiliary key that is forced upon the shaft to secure the clamp more firmly thereto.

Similar letters refer to similar parts throughout the several views.

In the accompanying drawings, A represents the shaft. B and B' represent the two halves of the divided hub of a pulley, cam, or other article to be secured to the shaft, and C represents the clamping-bow, which secures the hub to the shaft.

My clamping device is constructed as follows: The hub is fitted to exactly fit outside of the shaft and inside of the clamping-bow. Each half of this hub is provided with a groove *b* for the reception of the key that clamps it to the shaft and designed, first, as a key-seat and incline with which to force the hub firmly around the shaft, and, second, to prevent the hub from working endwise to disengage it from the clamp. In practice the clamp C is placed around the shaft, the hubs B B' are inserted between it and the shaft, and the key D' is driven solidly to place. To more thoroughly secure the hubs to the shaft and avert all danger of their slipping thereon, I form a mortise through one of the half-hubs, as at *e*, for the reception of the key E, which is placed therein, and after the key D' has been securely driven the key D is driven through the mortise in the clamp prepared for its reception and forces the key E solidly against the shaft.

To remove the cams, pulleys, or whatever may be secured to the shaft, it is simply necessary to remove the keys D and D' and slide the hubs B and B' from the clamp.

Having thus fully described my invention, what I claim as new, and desire to secure by Letters Patent of the United States, is—

1. In combination with a shaft and cams, a clamp encircling the shaft, a divided hub encircling the shaft within the clamp, keys for securing the hub-sections firmly to the shaft, the surfaces of the sections of the hubs being provided with lateral key-seats so arranged that the hubs cannot be removed while the said keys are in position, substantially as and for the purpose set forth.

2. In combination with a shaft, a clamp encircling said shaft, a divided hub encircling said shaft within said clamp, lateral keys for securing said hub-sections to the shaft, said clamp and hub-sections having lateral keyways, one of said hub-sections provided with a radial keyway, and a radial key arranged to be forced against the shaft by one of said lateral keys, substantially as and for the purpose set forth.

Signed at Grand Rapids, Michigan, July 19, 1899.

JOHN R. BALL.

In presence of—
JAMES VANDENBERGE,
I. J. CILLEY.